(12) United States Patent
Robert

(10) Patent No.: US 10,351,441 B2
(45) Date of Patent: Jul. 16, 2019

(54) PRESSURIZED HYDRATION FILTRATION SYSTEM

(71) Applicant: Plano Molding Company, Plano, IL (US)

(72) Inventor: Jay Robert, Star, ID (US)

(73) Assignee: PLANO MOLDING COMPANY, Plano, IL (US)

( * ) Notice: Subject to any disclaimer, the term of this patent is extended or adjusted under 35 U.S.C. 154(b) by 307 days.

(21) Appl. No.: 15/264,739

(22) Filed: Sep. 14, 2016

(65) Prior Publication Data

US 2017/0081209 A1    Mar. 23, 2017

Related U.S. Application Data

(60) Provisional application No. 62/219,836, filed on Sep. 17, 2015.

(51) Int. Cl.
| | | |
|---|---|---|
| *C02F 1/00* | (2006.01) | |
| *B01D 29/11* | (2006.01) | |
| *B01D 29/27* | (2006.01) | |
| *B01D 29/90* | (2006.01) | |
| *B01D 29/92* | (2006.01) | |
| *B01D 29/96* | (2006.01) | |
| *B01D 35/02* | (2006.01) | |

(Continued)

(52) U.S. Cl.
CPC ................ *C02F 1/002* (2013.01); *A45F 3/16* (2013.01); *A45F 3/20* (2013.01); *B01D 29/114* (2013.01); *B01D 29/27* (2013.01); *B01D 29/90* (2013.01); *B01D 29/92* (2013.01); *B01D 29/96* (2013.01); *B01D 35/02* (2013.01); *A45F 2003/163* (2013.01); *A45F 2003/166* (2013.01); *C02F 2201/008* (2013.01)

(58) Field of Classification Search
CPC ...... A45F 2003/166; A45F 3/04; C02F 1/002; Y02A 20/212
See application file for complete search history.

(56) References Cited

U.S. PATENT DOCUMENTS

| | | |
|---|---|---|
| 2,222,914 A | 11/1940 | Pires |
| 5,060,833 A | 10/1991 | Edison et al. |

(Continued)

FOREIGN PATENT DOCUMENTS

| | | |
|---|---|---|
| CA | 2310636 A1 | 2/1999 |
| CA | 2354140 A1 | 6/2000 |

(Continued)

OTHER PUBLICATIONS

PCT International Searching Authority, PCT International Search Report and Written Opinion, PCT Application No. PCT/US2016/051636, dated Dec. 27, 2016.

(Continued)

*Primary Examiner* — Ana M Fortuna
(74) *Attorney, Agent, or Firm* — Leason Ellis LLP

(57) ABSTRACT

A system and process for taking a liquid such as water from a source and supplying the liquid by, for example, pushing the liquid through a filter provided inside a reservoir in order to render the liquid clean and potable. The reservoir and filter may be surrounded 360-degrees by a pressure bladder that may be wrapped with a material such as nylon, so that substantially all pressure goes inwards towards the filter.

18 Claims, 5 Drawing Sheets

(51) Int. Cl.
*A45F 3/16* (2006.01)
*A45F 3/20* (2006.01)

(56) References Cited

U.S. PATENT DOCUMENTS

| | | | |
|---|---|---|---|
| 5,122,272 | A | 6/1992 | Iana et al. |
| 5,552,046 | A | 9/1996 | Johnston et al. |
| 5,560,820 | A | 10/1996 | Consolo |
| 5,569,374 | A | 10/1996 | Williams |
| 5,733,448 | A * | 3/1998 | Kaura ............... C02F 1/003 |
| | | | 210/238 |
| 5,919,365 | A | 7/1999 | Collette |
| 6,136,188 | A * | 10/2000 | Rajan ............. B01D 35/027 |
| | | | 210/244 |
| 6,267,506 | B1 | 7/2001 | Campion |
| 6,344,146 | B1 | 2/2002 | Moorehead et al. |
| 6,379,544 | B1 | 4/2002 | Chen |
| 6,454,132 | B2 | 9/2002 | Campion |
| 6,569,329 | B1 | 5/2003 | Nohren, Jr. |
| 6,764,064 | B2 | 7/2004 | Sturm et al. |
| 6,919,025 | B2 | 7/2005 | Cluff et al. |
| 7,044,343 | B2 | 5/2006 | Anue |
| 7,514,006 | B1 | 4/2009 | Lundquist |
| 7,534,349 | B2 | 5/2009 | Collins et al. |
| 7,862,720 | B2 | 1/2011 | Brown |
| 8,043,005 | B2 | 10/2011 | Lyon et al. |
| 8,083,105 | B2 | 12/2011 | Reichert et al. |
| 8,147,685 | B2 | 4/2012 | Pritchard |
| 8,166,969 | B2 | 5/2012 | Hall et al. |
| 8,186,881 | B2 | 5/2012 | Lyon et al. |
| 8,343,347 | B2 | 1/2013 | Collins et al. |
| 8,540,122 | B2 | 9/2013 | Skillern et al. |
| 8,557,115 | B2 | 10/2013 | Collins et al. |
| 2003/0164333 | A1 | 9/2003 | Nohren, Jr. et al. |
| 2004/0089301 | A1 | 5/2004 | Choi et al. |
| 2005/0035041 | A1 * | 2/2005 | Nohren, Jr. ............ A45F 3/16 |
| | | | 210/209 |
| 2006/0071006 | A1 | 4/2006 | Lojkutz et al. |
| 2006/0157398 | A1 | 7/2006 | Nohren, Jr. |
| 2006/0243765 | A1 | 11/2006 | Valeriana |
| 2006/0255048 | A1 | 11/2006 | Bemis |
| 2007/0280565 | A1 | 12/2007 | Lyon et al. |
| 2008/0029561 | A1 | 2/2008 | Reichert et al. |
| 2009/0179046 | A1 | 7/2009 | Reichert et al. |
| 2009/0242587 | A1 | 10/2009 | Bemis |
| 2011/0108575 | A1 | 5/2011 | Alder |
| 2011/0192785 | A1 | 8/2011 | Pritchard et al. |
| 2011/0220568 | A1 | 9/2011 | Ruprecht |
| 2012/0111876 | A1 | 5/2012 | Pfotenhauer |
| 2012/0152811 | A1 | 6/2012 | Wright |
| 2012/0152844 | A1 | 6/2012 | Pritchard |
| 2013/0015267 | A1 | 1/2013 | Brensinger et al. |
| 2013/0075410 | A1 | 3/2013 | Wood |
| 2013/0319084 | A1 | 12/2013 | Milman et al. |
| 2014/0008285 | A1 | 1/2014 | Nohren, Jr. et al. |
| 2015/0307265 | A1 * | 10/2015 | Winn ................ A23L 2/395 |
| | | | 426/66 |

FOREIGN PATENT DOCUMENTS

| | | |
|---|---|---|
| CA | 2621209 A1 | 3/2007 |
| CA | 2663769 A1 | 12/2015 |
| KR | 10-1997-0706857 | 12/1997 |
| WO | 1999004667 A1 | 2/1999 |
| WO | 2000068151 A3 | 5/2000 |
| WO | 2000034183 A9 | 4/2001 |
| WO | 2002070399 A1 | 9/2002 |
| WO | 2003014025 A1 | 2/2003 |
| WO | 2003068689 A1 | 8/2003 |
| WO | 2004065229 A3 | 12/2004 |
| WO | 2006021966 A1 | 3/2006 |
| WO | 2006115719 A2 | 11/2006 |
| WO | 2007028044 A1 | 3/2007 |
| WO | 2008037969 A1 | 4/2008 |
| WO | 2009064907 A1 | 5/2009 |
| WO | 2009155333 A2 | 12/2009 |
| WO | 2010038015 A1 | 4/2010 |
| WO | 2010138462 A3 | 4/2011 |
| WO | 2010151848 A3 | 4/2011 |
| WO | 2013038179 A1 | 3/2013 |
| WO | 2013169707 A1 | 11/2013 |
| WO | 2014011514 A1 | 1/2014 |

OTHER PUBLICATIONS

Geigerrig Pressurized Hydration Bladders | In-line Water Filters and Accessories; http://www.geigerrig.com/hydration-packs/accessories-reservoir-bladders-bite-valves-backp...; Sep. 2, 2014, pp. 1-3.

* cited by examiner

PRESSURIZED HYDRATION FILTRATION SYSTEM

CROSS REFERENCE TO PRIOR APPLICATION

This application claims priority to and the benefit thereof from U.S. Provisional Patent Application No. 62/219,836 filed on Sep. 17, 2015, titled "PRESSURIZED HYDRATION FILTRATION SYSTEM" the entirety of which is hereby incorporated herein by reference.

FIELD OF THE DISCLOSURE

The present disclosure relates generally to an apparatus and a process for delivering a liquid from a container to a user; and, more specifically, for holding, filtering and delivering a filtered liquid from the apparatus to the user through a conduit.

BACKGROUND OF THE DISCLOSURE

With existing portable water filtration systems, when a user pressurizes a hydration bag the overall package gets bigger. Known systems include filters in the supply hose. Accordingly, known systems use small filters that are contaminated easily. These systems also filter water at a very slow rate and generally require a high degree of suction for someone to drink out of them.

As of this writing, a hydration reservoir bag is known, which requires a user to inflate an inner air chamber of the bag to pressurize the water reservoir portion. As a result, the bag expands and grows in size, taking up more room in the pack. This unit has a flat air chamber on one side. The unit includes a filter portion that is located in the supply hose, so the water is purified when it reaches the user's mouth. The filtration portion is very small and gets dirty quickly. Due to its size, the filtration portion can severely obstruct liquid flow to the user. When dirty or contaminated, the user must throw it away and buy a new one.

An unfulfilled need exists for a compact, high filtration-rate liquid filtration system having a filter that is not easily contaminated, and which, if contaminated, may be cleaned and reinstalled easily.

SUMMARY OF THE DISCLOSURE

According to the principles of the present disclosure, an apparatus and a process are provided that include a compact, high filtration-rate liquid filtration system having a filter that is not easily contaminated, and which, if contaminated or soiled, may be cleaned and reinstalled easily.

According to an aspect of the disclosure, a portable liquid pack is provided, comprising: a reservoir that holds a liquid; a pressure casing that includes a 360-degree chamber; and a filter that filters the liquid in the liquid reservoir, wherein the filter is installable inside the reservoir to filter the liquid when liquid is evacuated from the reservoir. The pressure casing comprises an inner wall and an outer wall, the inner wall being configured to move and apply a force against the reservoir. The inner wall of the pressure casing may be configured to apply a central 360-degree force against an outer wall of the reservoir, thereby causing a capacity of the reservoir to be reduced. The outer wall does not expand when the inner wall moves and applies the force against the reservoir. The outer wall of the pressure casing may comprise 210 nylon material.

The pressure casing may comprise a bladder made of a material suitable for use in holding a liquid for human consumption.

The reservoir may comprise a cap that is removable. The reservoir may comprise a bottom wall having an opening that receives and passes there-through the filter.

The liquid pack may further comprise a gas supply conduit that supplies a gas to the 360-degree chamber.

The liquid pack may further comprise a pump that supplies a pressurized gas to the 360-degree chamber.

The liquid pack may further comprise a liquid supply conduit fluidly coupled to the filter, wherein the liquid supply conduit receives fluid from the filter and delivers the fluid to a mouthpiece. The liquid pack may further comprise a valve to control flow of the liquid from the liquid supply conduit.

According to a further aspect of the disclosure, a portable liquid pack is provided, comprising: a reservoir that holds a liquid; a filtration system that filters the liquid in the liquid reservoir, wherein a portion of the filtration system is installable inside the reservoir to filter the liquid when liquid is evacuated from the reservoir. The liquid pack may further comprise a pressure casing having an inner wall that moves toward the reservoir and applies a force against an external wall of the reservoir. The pressure casing may comprise a 360-degree chamber. The liquid pack may be included in a backpack.

Additional features, advantages, and embodiments of the invention may be set forth or apparent from consideration of the following detailed description and drawings. Moreover, it is noted that both the foregoing summary of the invention and the following detailed description are exemplary and intended to provide further explanation without limiting the scope of the invention.

BRIEF DESCRIPTION OF THE DRAWINGS

The accompanying drawings, which are included to provide a further understanding of the disclosure, are incorporated in and constitute a part of this specification, illustrate embodiments of the disclosure, and together with the detailed description serve to explain the principles of the disclosure. No attempt is made to show structural details of the disclosure in more detail than may be necessary for a fundamental understanding of the disclosure and the various ways in which it may be practiced.

Figure 1:
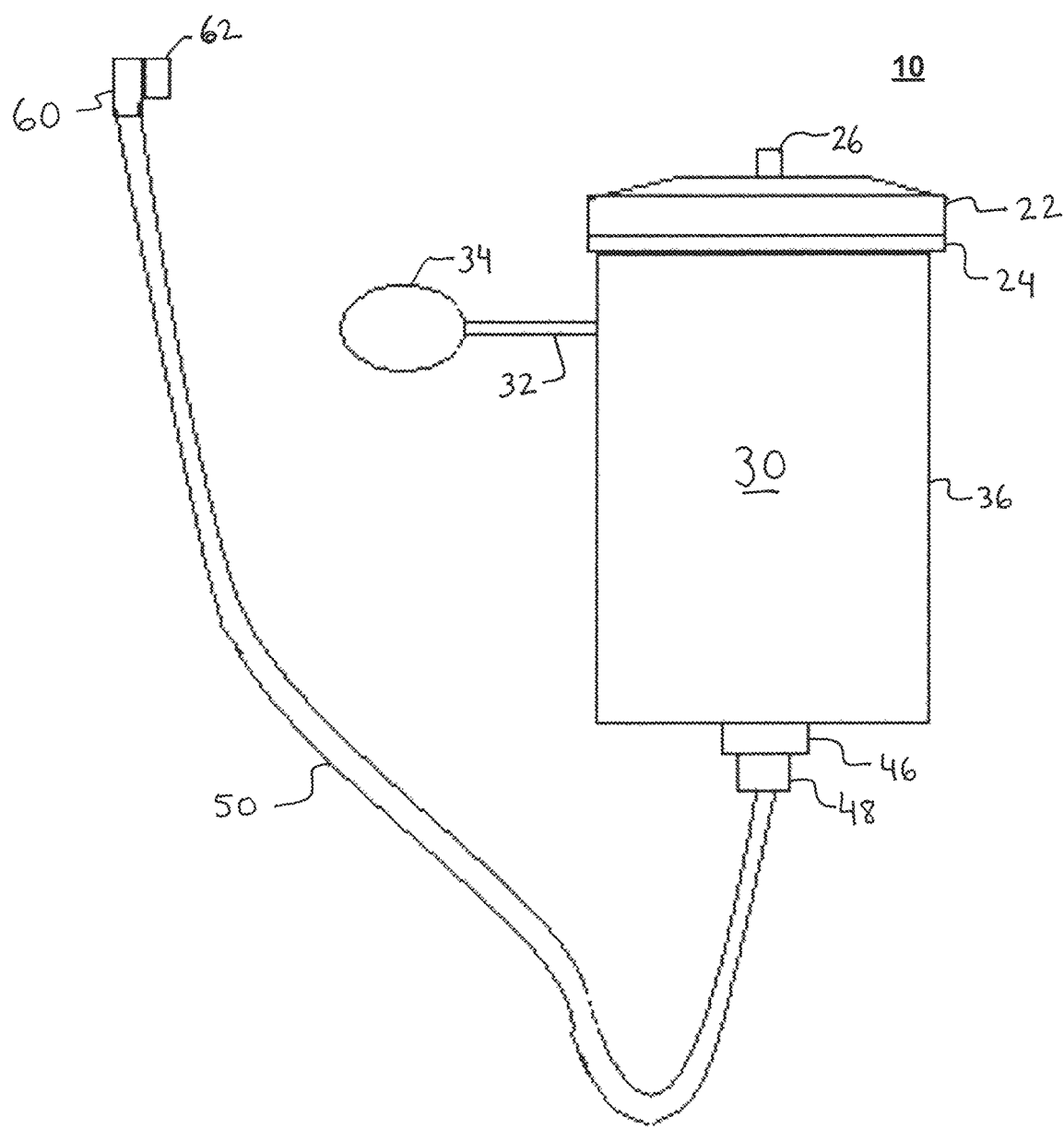
FIG. 1 shows an example of a liquid pack that is constructed according to the principles of the disclosure.

The present disclosure is further described in the detailed description and drawings that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 2:
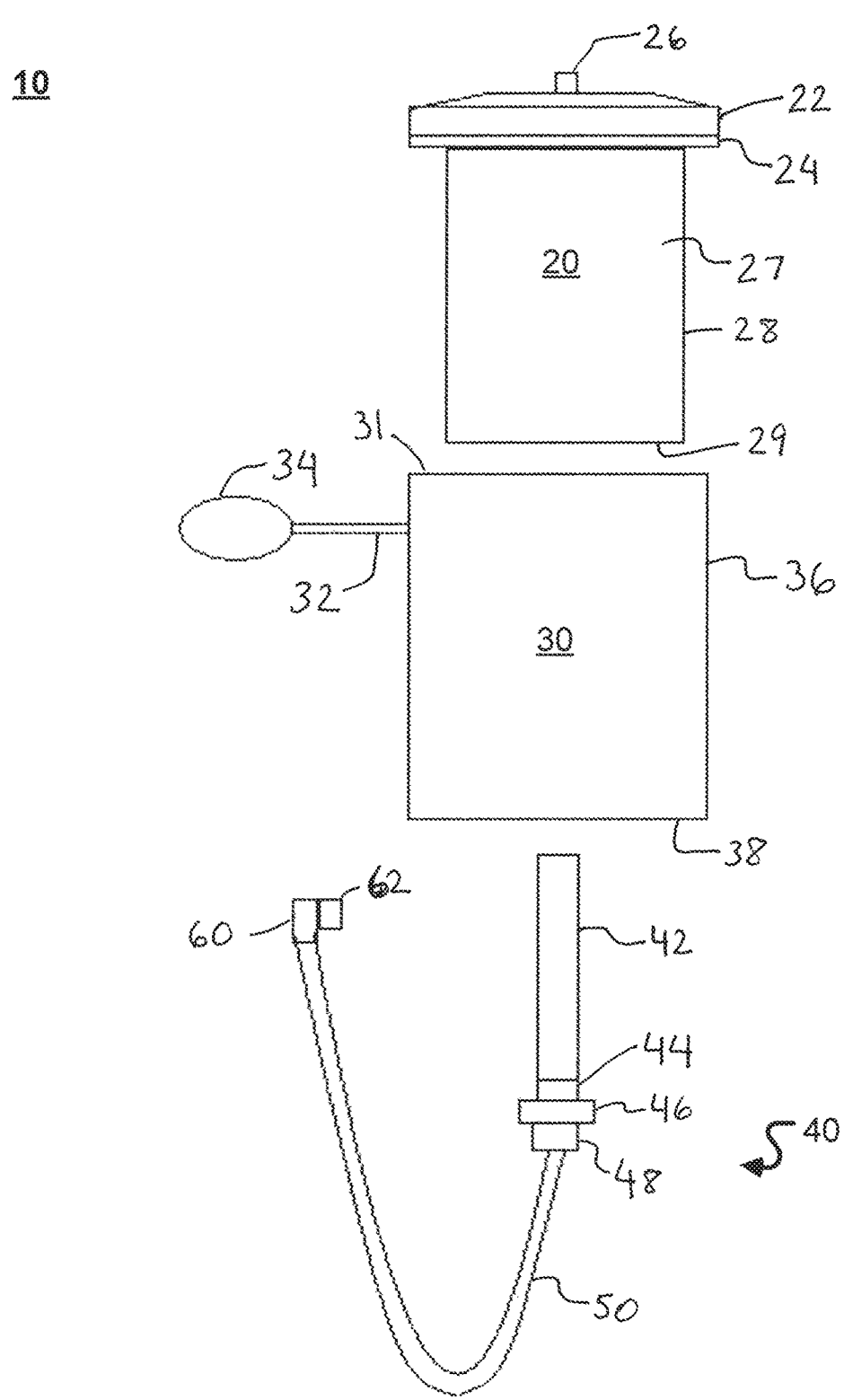
FIG. 2 shows an exploded view of the liquid pack in FIG. 1.
Figure 4:
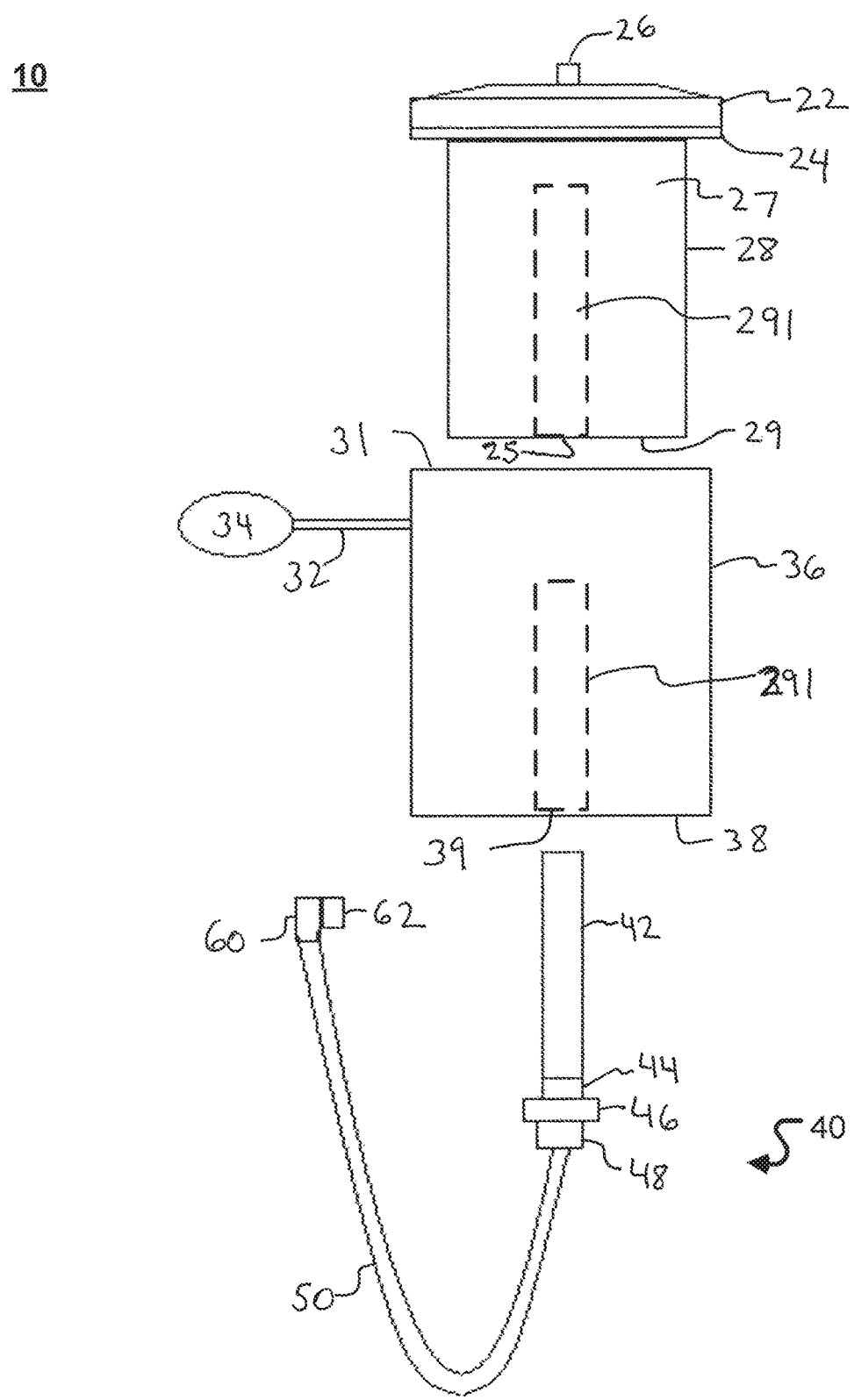
FIG. 4 shows an exploded view of the liquid pack in FIG. 1, showing a portion of a filtration system.

FIG. 1 shows an example of a liquid pack apparatus 10 that is constructed according to the principles of the disclosure; and, FIGS. 2 and 4 show an exploded view of the liquid pack apparatus 10.

Referring to FIGS. 1, 2 and 4, the liquid pack 10 comprises a reservoir 20, a pressure casing 30, a filtration system 40, a liquid supply conduit 50, and a mouthpiece 60. As seen, the reservoir 20 may be inserted into the pressure casing 30, and a portion 291 of the filtration system 40 may be inserted into the reservoir 20. The filtration portion 291 may include a filter 42. The filtration system 40 is configured to remove contaminants from a liquid as the liquid flows through the filtration system 40 due to a pressure difference.

The reservoir 20 may include a cap 22 and a reservoir container 27. The cap 22 may be removably attached to reservoir container 27. The cap 22 may be secured to the reservoir container 27 by a coupling mechanism, such as, for example, threading, tongue-and-groove, clamp, or the like. The reservoir 20 may include a mount interface 24. The reservoir container 27 comprises a surrounding wall 28 and a bottom wall (or floor) 29. The mount interface 24 may be attached to, or integrally formed with the surrounding wall 28. The cap 22 may be attached to, or, alternatively, integrally formed with the mount interface 24. The mount interface 24 may be constructed to contact a portion 31 (e.g., an upper rim portion) of the pressure casing 30. The mount interface 24 may function as a stop for the pressure casing 30, so as to facilitate proper positioning of the pressure casing 30 with respect to the reservoir 20.

The surrounding wall 28 and bottom wall 29 may be formed as a single piece or as separate parts that are attachable to each other to form the reservoir container 27. The surrounding wall 28 and bottom wall 29 may be made of the same material, or of different materials. The material(s) may include a flexible, expandable, and/or stretchable material such as, for example, a silicon liquid rubber, a rubber, a polyethene (low density) LDPE, a biodegradable polymer, or the like. In the case of the bottom wall 29, the material may include a substantially hard material, such as, for example, a plastic, a metal, a carbon-fiber, or the like. The wall 28 by itself, or together with the wall 29 may form a flexible bladder.

Figure 3A:
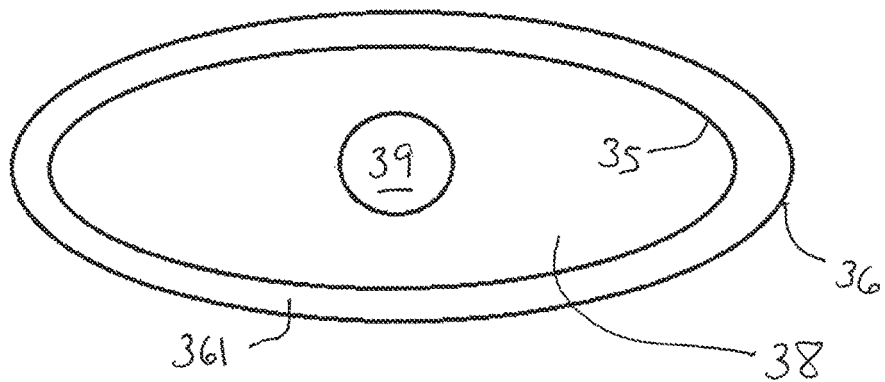
FIG. 3A shows a bottom view of an example of a pressure casing that may be included in the liquid pack in FIG. 1, including a filter pass-through opening in the bottom wall.

Referring to FIG. 4, the bottom wall (or floor) 29 may include a filter opening 25, which may align with a pass-through opening 39 in an embodiment of the pressure casing 30 having a bottom wall 38 that includes the pass-through opening 39 (shown in FIG. 3A). The filter opening 25 may be configured to receive and pass there-through a portion 291 of the filtration system 40 (shown in broken lines in FIG. 4) and provide a hermetic seal between the wall 29 and filtration system 40. The filter opening 25 may include a threading, a coupling mechanism, (e.g., a compression fitting), or other mechanism to receive and mate with the filter interface 44 in the filtration system 40, so as to securely hold the filtration system 40 in place, while providing a hermetic seal between the inner chamber (not shown) of the reservoir container 27 and external to the reservoir container 27, thereby preventing fluid from flowing through the filter opening 25 when attached to the filter interface 44.

The cap 22 and/or mount interface 24 may be made of a flexible material similar to the surrounding wall 28, or a substantially rigid material, such as, for example, a plastic (e.g., high-density polyethylene (HDPE)), a metal, carbon fiber, fiberglass or the like.

The reservoir 20 may be configured to hold a predetermined amount of liquid (such as, e.g., 500 ml, 1 l, 2 l, 3 l, or the like, of water) inside the inner walls 28, 29 of the reservoir container 27. As noted above, the reservoir 20 may be constructed of an expandable and/or stretchable material, such as, for example, rubber, or other material that is expandable and/or stretchable and that may be used to store liquids for human consumption. The material used for the walls necessarily allows the volume of the reservoir 20 to decrease under external pressure, or increase in the absence of external pressure or under internal pressure, which may be exerted on the outer reservoir wall 28 by the inner wall 35 (shown in FIGS. 3A, 3B) of the pressure casing 30. The reservoir container 27 is configured to collapse inward when the pressure inside its walls 28 is less than the pressure outside of the walls 28, and expand outward when the pressure inside the walls 28 is greater than the pressure outside of the walls 28.

As noted earlier, FIG. 3A shows a bottom view of an example of the pressure casing 30 with the bottom wall 38 having a pass-through opening 39 to receive and pass there-through the portion 291 of the filtration system 40 (shown in FIG. 4). The pressure casing 30 includes a gas chamber 361 that may be supplied with a gas such as air (e.g., inflated with air). Although shown as surrounding the bottom wall (or floor) 38 of the pressure casing 30 in FIG. 3A, the chamber 361 may be positioned such that the outer perimeter of the outer wall 36 is substantially flush with the perimeter edge of the bottom wall 38. The bottom wall 38 may be separately provided and attached to the outer wall 36 (and/or chamber 361) or integrally formed with the outer wall 36 (and/or chamber 361).

Figure 3B:
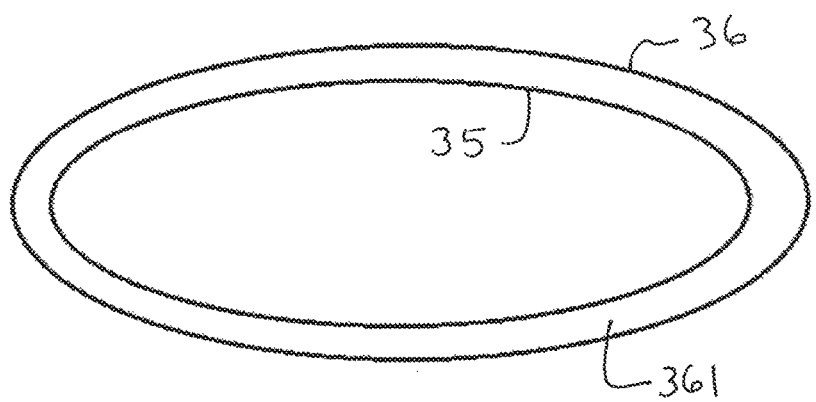
FIGS. 3B and 3C show a bottom cross-sectional view of the pressure casing that may be included in the liquid pack in FIG. 1, showing the pressure casing in a substantially non-pressurized state and a substantially pressurized state, respectively.
Figure 3C:
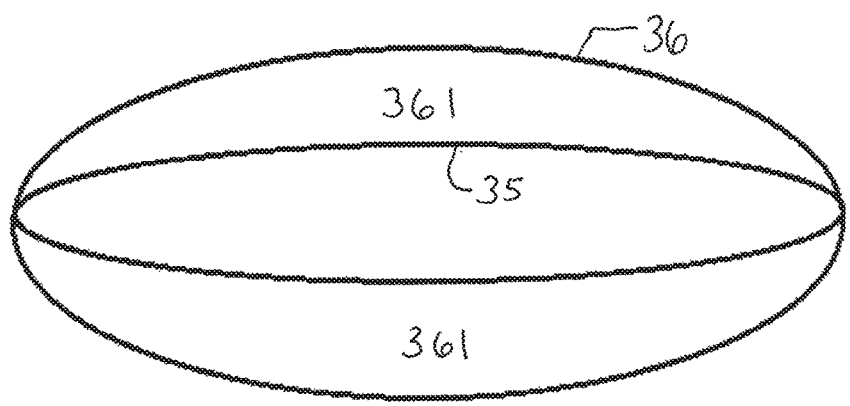

FIGS. 3B and 3C show an example of a bottom cross-section cut view of the pressure casing 30. As seen, the pressure casing 30 has an opening formed by the inner wall 35 having a diameter that is substantially the same as, or greater than the diameter of the outer wall 28 of the reservoir container 27. More specifically, FIG. 3B shows the bottom view of the pressure casing 30 in a substantially non-pressurized state; and, FIG. 3C shows the bottom view of the pressure casing 30 in substantially pressurized state. The pressure casing 30 may have any shape, including, for example, a cylindrical shape, a spherical shape, a rectangular shape, or any other geometric shape without departing from the scope and spirit of the disclosure.

According to an alternative example (not shown), the opening 39 may have substantially the same diameter as the diameter of the opening formed by the inner wall 35. In this example, the height (or length) may be substantially the same as, or less than the height (or length) of the wall 28 of the reservoir container 27.

Referring to FIGS. 2 and 3A-3C, chamber 361 may be formed by an inner wall 35 and an outer wall 36 of the pressure casing 30, or the chamber 361 may be provided as a separate component (not shown), such as, for example, a bladder (e.g., a donut-shaped bladder, cylinder-shaped bladder, rectangular-shaped bladder, or any other geometrically shaped bladder, or the like), that is inserted between and held by the inner wall 35 and outer wall 36. The inner wall 35 may be made of a flexible, expandable material such as rubber, or the like. The outer wall 36 may be made of an inflexible material such as, for example, plastic, metal, carbon-fiber, fiberglass, or the like, or a flexible, but non-expandable material such as, for example, a fabric (e.g., canvas, cloth, denim, fabric, or the like), a nylon fabric (210 nylon), or the like.

The chamber 361 may be made of an air-impermeable material. In the example where the chamber 361 is formed by the inner wall 35 and outer wall 36 of the pressure casing 30, and not as a separate component that is encapsulated in the inner and outer walls 35, 36, respectively, the walls 35 and 36 may be made of air-impermeable material.

The chamber 361 may comprise a 360-degree (360°) gas chamber that is constructed to hold a gas such as air. The chamber 361 may comprise a donut-shaped structure, a cylinder-shaped structure, a rectangular-shaped structure, a spherical-shaped structure, or any other geometrically-shaped structure that can cause or facilitate causing the inner wall 35 to move inward and apply an inward pressure on at least a portion of the wall 28 of the reservoir container 28 to force a liquid in the reservoir container 28 to flow through the filter 42 and out through the liquid supply conduit 50. The 360-degree chamber may provide a distributed, central, inwardly (or outwardly) directed force during expansion of the chamber 361. The chamber 361 may comprise, for example, a less than 360° chamber, such as a chamber that has walls (not shown) that prevent the chamber 361 from expanding all the way around (360-degrees) between the inner wall 35 and outer wall 36. For instance, the chamber 361 may be provided with two sub-chambers (not shown) that may be provided opposite each other, such that portions of the inner walls 35 of the sub-chambers move toward each other when air is supplied to the sub-chambers, thereby squeezing the reservoir container wall 28 that is sandwiched between the inner walls 35 of the sub-chambers. It is noted that the outer wall 36 would not expand.

Referring to the example of the pressurized casing 30 in FIG. 3B, a gas such as air may be supplied under pressure (for example, greater than 1 atmospheric pressure, 2 atmospheric pressure, or the like) into the chamber 361, thereby increasing the pressure of the gas in the chamber 361 and resultantly forcing the inner wall (e.g., inner wall 35) of the chamber 361 to expand inward, away from the outer wall 36, to a substantially pressurized state, shown in FIG. 3C. It is noted that the chamber 361 may be substantially completely collapsed when evacuated of gas (not shown).

The gas may be supplied to the chamber 361 by way of a gas supply conduit 32 and a pump 34. The pump 34 may comprise, for example, an air pressure bulb (shown in FIG. 1). The conduit 32 and/or pump 34 may be integrally formed with the pressurized casing 30, or provided separately and attached to the chamber 361.

Referring to FIGS. 2 and 4, the filtration system 40 may include a filter 42, the filter interface 44, a filter mount interface 46, and a liquid conduit interface 48. The filter 42 may be replaceably attached to the filter interface 44, or integrally formed with the filter interface 44. The filter interface 44 may include a threading around its outer surface, or a coupling mechanism (e.g. a compression fitting), or the like, to engage and mate with the filter opening 25 provided in the bottom wall 29 of the reservoir container 27, as discussed above.

The filtration filter 42 may have, for example, about 24 square-inches of filtration area. It is noted, however, other dimensions are contemplated for the filtration filter 42, including dimensions smaller and greater than 24 square-inches in filtration area. As seen in FIGS. 2 and 4, the filter 42 can be removed from the reservoir 20, cleaned, and put back into the liquid pack 10 without contamination. In the case of the liquid being water, the filter 42 can be taken out of the reservoir 20, cleaned, and put back into the reservoir without contaminating the water going through the liquid supply conduit 50.

The filter mount interface 46 may include a threading around its outer surface (not shown), or other coupling mechanism, so as to engage a corresponding threading or coupling mechanism provided on the inner surfaces (not shown) of the opening 39 in the bottom wall 38 of the pressure casing 30. In this example, after the pressure casing 30 (shown in FIG. 2) is slid over the reservoir container 27, the filter 42 may be inserted through the openings 39 and 25, and the filter interface 44 and filter mount interface 46 may be turned simultaneously so as to force and drive the pressure casing 30 toward and into contact with the mount interface 24, thereby securing the pressure casing 30 in proper position with respect to the reservoir 20.

Alternatively, the filter mount interface 46 may have a diameter that is substantially greater than the diameter of the opening 39. In this example, after the pressure casing 30 is slid over and onto the reservoir container 27, the filter interface 44 may be coupled to the opening 25 in the bottom wall 29 of the reservoir container 27, and the upper surface of the filter mount interface 46 will contact and force the bottom wall 38 of the pressure casing 30 in the direction of the cap 22, so as to secure the pressure casing 30 to the reservoir 20.

According to another example, the filter mount interface 46 may be omitted from the filtration system 40.

Referring to FIGS. 1, 2 and 4, the liquid conduit interface 48 may be attached to one end of the liquid supply conduit 50, or integrally formed with the conduit 50. In one, non-limiting example, an end of the liquid supply conduit 50 may be slid over and onto a pipe portion (not shown) that may extend from the conduit interface 48, in a direction opposite to the direction of filter 42. A clamp (not shown) may be installed on the end of the liquid supply conduit 50 and the pipe portion, thereby securing the end of the liquid supply conduit 50 to the pipe portion to prevent unintended removal of the pipe portion from the conduit 50.

The other end of the liquid conduit 50 may be attached to, or integrally formed with the mouthpiece 60. The mouthpiece 60 may include a valve 62, such as, for example, a bite valve, or any other device that can control flow of a liquid from the liquid conduit 50, including turning on/off flow of liquid from the liquid conduit 50.

Figure 5:
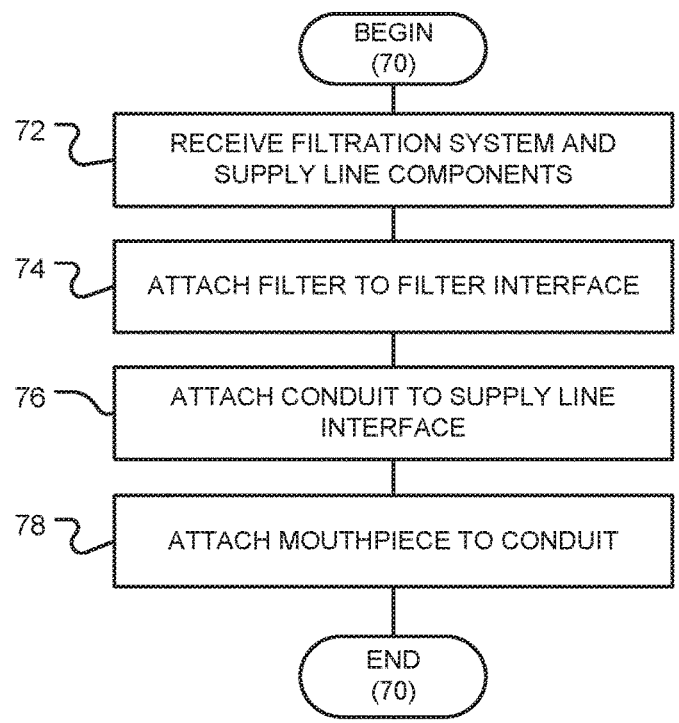
FIG. 5 shows an example of a process for assembling a filtration system and a supply line system, according to the principles of the disclosure.

FIG. 5 shows example of a process 70 for assembling one embodiment of the filtration system 40 and a supply line system 50, 60 according to the principles of the disclosure. Initially, all of the components of the filtration system 40 and supply line system 50, 60 may be received at a predetermined site (Step 72). After the filtration system 40 components are received, the filter 42 may be attached to the filter interface 44 (Step 74). For instance, the filter 42 may include a threading or other coupling mechanism (e.g., a compression coupler) that may engage and mate with a corresponding threading or coupling mechanism on the filter interface 44 to secure the filter to the filter interface 44. This Step 74 may be omitted where the filter 42 is integrally formed with the filter interface 44.

After all of the components of the supply line system 50, 60 are received (Step 72), an end of the liquid supply conduit 50 may be attached to the conduit interface 48 (Step 76), as discussed above with respect to the non-limiting example. This Step 76 may be omitted where the conduit 50 is integrally formed with the conduit interface 48. If not already integrally formed with the conduit 50, the mouthpiece 60, including valve 62, may be attached to the other end of the liquid conduit (Step 78). In one non-limiting example, the mouthpiece 60 may include a pipe portion (not shown) that may be inserted in and secured to the end of the liquid conduit 50. A clamp (not shown) may be provided and installed over the pipe portion (not shown) and liquid conduit 50 end portion, thereby securing the liquid conduit 50 to the mouthpiece 60.

Figure 6:
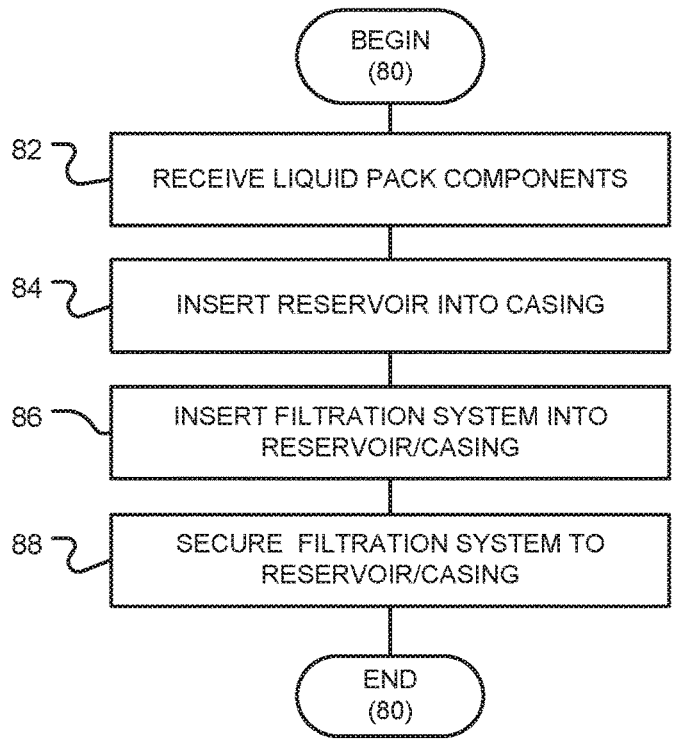
FIG. 6 shows an example of a process for assembling the liquid pack, according to the principles of the disclosure.

FIG. 6 shows an example of a process 80 for assembling the liquid pack 10 (shown in FIGS. 1, 2 and 4), according to the principles of the disclosure. Initially, all of the components of the liquid pack 10 may be received (Step 82), including the reservoir 20, pressure casing 30, filtration system 40, and liquid supply line system 50, 60. The reservoir container 27 may be inserted into the pressure casing 30 (Step 84). Alternatively, the pressure casing 30 may be slid over and onto the reservoir container 27. Once the pressure casing 30 is positioned over the reservoir container 27, enveloping the wall 28 of the reservoir container 27 substantially entirely, the filter 42 may be aligned with and inserted through the openings 39 and 25 (Step 86). Once the filter interface 44 contacts the opening 25, the filter interface 44 may be turned or pressed into the opening 25, depending on the coupling mechanism employed to hermetically seal and secure the filter interface 44 to the opening 25 (Step 88). Simultaneously, the filter mount interface 46 may securely attach to the opening 39, or contact the lower surface of the wall 38 and force the pressure casing 30 toward the cap 22, thereby securely assembling the liquid pack 10.

In the example of the pressure casing 30 having an opening 39 with a diameter that is substantially the same as, or greater than the outer diameter of the wall 28 of the reservoir container 27 (example not shown), the pressure casing 30 may be slid over the reservoir container 27, and, after being properly positioned, air may be pumped into the chamber 361 to secure the pressure casing 30 to the reservoir 20.

The assembled liquid pack 10 may be installed in a back pack (not shown), a bag (not shown), or any other container (not shown) for use.

Referring to FIG. 1, the liquid pack 10 may be used by a single user to take water from most any non-salt water supply and store the water in, for example, a backpack (not shown). The liquid pack 10 is designed to pressurize the pressure casing 30, thereby pushing water from the liquid reservoir 20, through the filtration system 40 and supplying clean water to the user via the mouthpiece 60.

According to a non-limiting example, a method is provided for implementing the portable liquid pack 10. The method comprises (1) scooping water using the liquid reservoir 20 from, for example, any non-salt water source; (2) inserting the filter 42 (optional) into the liquid reservoir 20; (3) sealing the liquid reservoir up with the cap 22; and (4) installing the pressure casing 30 onto the liquid reservoir 20. When the user wishes to dispense clean water, the user may (5) squeeze the pump 34, thereby pushing air into the pressure casing 30 and forcing water to flow from the reservoir 20 through the filter 42 and out through the liquid supply conduit 50 to the valve 64. It is noted that the bottom wall 29 of the reservoir container 27 may include a displaceable flap (not shown) that covers the opening 25 to provide a substantially water-tight seal, wherein the flap may be forced open by insertion of the filter 42 through the opening 25.

As noted above, the liquid pack 10 comprises a portable liquid filtration system 40 that includes a pressure casing 30 and a reservoir 20, wherein the reservoir 20 has a large filtration area. The liquid pack 10 provides a compact design that makes filtered liquid much more accessible and freely dispensed. The liquid pack 10 comprises a pressure casing 30 that may be covered 100% around the outside. The reservoir 20 may hold a pre-determined amount of liquid. The pressure casing 30 may be enclosed in, covered with, or formed from a material such as, for example, a nylon fabric (e.g., 210 nylon), so as to minimize or prevent outward stretching beyond a predetermined size.

The liquid pack 10 further comprises the liquid filtration system 40 that may include the filter 42 that may be provided inside the reservoir. The liquid may be pushed or sucked through the filter 42. The liquid pack 10, including the filtration system 40, is designed to make getting liquid (such as, e.g., water) from an un-known source and purifying it for drinking. It is also designed to make the liquid flow from the liquid conduit 50, so that the user doesn't have to suck it through the entire process. The system can be used with or without the filtration filter 42 in the reservoir 20.

The liquid pack 10 is configured so that it can be hung up and the water will gravity-feed through the filter 42 slowly by itself, without any pressurization. It is designed so that the user can replace filters and use the type of filter 42 needed for, for example, the area the user intends to drink water from.

The terms "including," "comprising," and variations thereof, as used in this disclosure, mean "including, but not limited to," unless expressly specified otherwise.

The terms "a," "an," and "the," as used in this disclosure, means "one or more," unless expressly specified otherwise.

When a single structure or article is described herein, it will be readily apparent that more than one device or article may be used in place of a single device or article. Similarly, where more than one device or article is described herein, it will be readily apparent that a single structure or article may be used in place of the more than one structure or article. The functionality or the features of a structure or article may be alternatively embodied by one or more other structures or articles that are not explicitly described as having such functionality or features.

While the invention has been described in terms of exemplary embodiments, those skilled in the art will recognize that the invention can be practiced with modifications in the spirit and scope of the instant disclosure. These examples given above are merely illustrative and are not meant to be an exhaustive list of all possible designs, embodiments, applications or modifications of the invention.

What is claimed is:

1. A portable liquid pack, comprising:
a reservoir that holds a liquid;
a pressure casing that includes a 360-degree chamber surrounding the reservoir; and a filter that filters the liquid in the liquid reservoir,
wherein the filter is installed inside the reservoir to filter the liquid when liquid when the liquid is evacuated from the reservoir through a conduit fluidly coupled to the filter to receive liquid from the filter,
a gas supply conduit and a pump that supplies a gas to the 360-degree chamber, and
wherein the pressure casing comprises an inner wall and an outer wall, the inner wall being configured to move and apply a force against the reservoir.

2. The liquid pack of claim 1, wherein the inner wall of the pressure casing is configured to apply a central 360-degree force against an outer wall of the reservoir, thereby causing a capacity of the reservoir to be reduced.

3. The liquid pack of claim 1, wherein the outer wall does not expand when the inner wall moves and applies the force against the reservoir.

4. The liquid pack of claim 1, wherein the outer wall of the pressure casing comprises 210 nylon material.

5. The liquid pack of claim 1, wherein the pressure casing comprises a bladder made of a material suitable for use in holding a liquid for human consumption.

6. The liquid pack of claim 1, wherein the reservoir comprises a cap that is removable.

7. The liquid pack of claim 1, wherein the reservoir comprises a bottom wall having an opening that receives and passes there-through the filter.

8. The liquid pack of claim 1, wherein the conduit delivers the fluid to a mouth piece.

9. The liquid pack of claim 8, further comprising a valve to control flow of the liquid from the liquid supply conduit.

10. A portable liquid pack, comprising:
a reservoir that holds liquid;
a pressure casing surrounding the reservoir having an inner wall that moves toward the reservoir and applies a force against an external wall of the reservoir;
a gas supply conduit and a pump that supplies a gas to the pressure casing;
a filtration system that filters the liquid in the liquid reservoir; and
a mouth piece connected to the filtration system for removing filtered liquid from the reservoir,
wherein a portion of the filtration system is installed inside the reservoir to filter the liquid when the liquid is evacuated from the reservoir though the mouth piece.

11. The liquid pack of claim 10, wherein the pressure casing comprises a 360-degree chamber.

12. The liquid pack of claim 10, wherein the pressure casing includes an outer wall that does not expand when the inner wall moves toward the reservoir.

13. The liquid pack of claim 10, wherein the capacity of the reservoir is reduced when the inner wall moves in a direction of the reservoir.

14. The liquid pack of claim 12, wherein the outer wall of the pressure casing comprises 210 nylon material.

15. The liquid pack of claim 10, wherein the pressure casing comprises a bladder made of a material suitable for use in holding a liquid for human consumption.

16. A backpack comprising the liquid pack of claim 10.

17. A portable liquid pack, comprising:
a reservoir that holds a liquid;
a pressure chamber casing having an inner wall that surrounds the reservoir;
a filter that filters the liquid in the liquid reservoir;
a conduit having a mouth piece for removing filtered liquid from the filter; and
a gas supply conduit and a pump that supplies a gas to the chamber casing,
wherein the filter is installed inside the reservoir to filter the liquid when liquid is evacuated from the reservoir through the mouth piece, and
wherein the pressure casing applies a force around the reservoir to evacuate the liquid from the reservoir.

18. The liquid pack of claim 17, wherein the inner wall of the pressure casing is configured to apply a force against an outer wall of the reservoir, thereby causing a capacity of the reservoir to be reduced.

* * * * *